(No Model.)

W. A. JULIAN.
HAND MIRROR.

No. 479,092. Patented July 19, 1892.

Witnesses
W. N. Bowman
Jno. Geo. Thrutt

Inventor
William Alex Julian
By his Attorney
Thompson & Bell

UNITED STATES PATENT OFFICE.

WILLIAM ALEX. JULIAN, OF CINCINNATI, OHIO.

HAND-MIRROR.

SPECIFICATION forming part of Letters Patent No. 479,092, dated July 19, 1892.

Application filed March 10, 1892. Serial No. 424,373. (No model.)

*To all whom it may concern:*

Be it known that I, WILLIAM ALEX. JULIAN, a citizen of the United States, residing at Cincinnati, county of Hamilton, and State of Ohio, have invented new and useful Improvements in Hand-Mirrors, of which the following is a specification.

My invention relates to an improvement in hand-mirrors; and it consists in a rear suction-chamber by which the mirror is securely held against a surface, particularly a perpendicular surface, and in any desired position to suit the requirements of the user.

The object of my invention is to provide a suction-chamber that will be capable of securely holding the mirror in position and from which the atmospheric air can be readily and perfectly exhausted when attaching the mirror to a vertical surface; also, means for quickly admitting atmospheric air into said chamber to disengage said mirror from the surface with which it is in contact. I attain these objects by means of the attachment illustrated in the accompanying drawings, in which—

Figure 1:
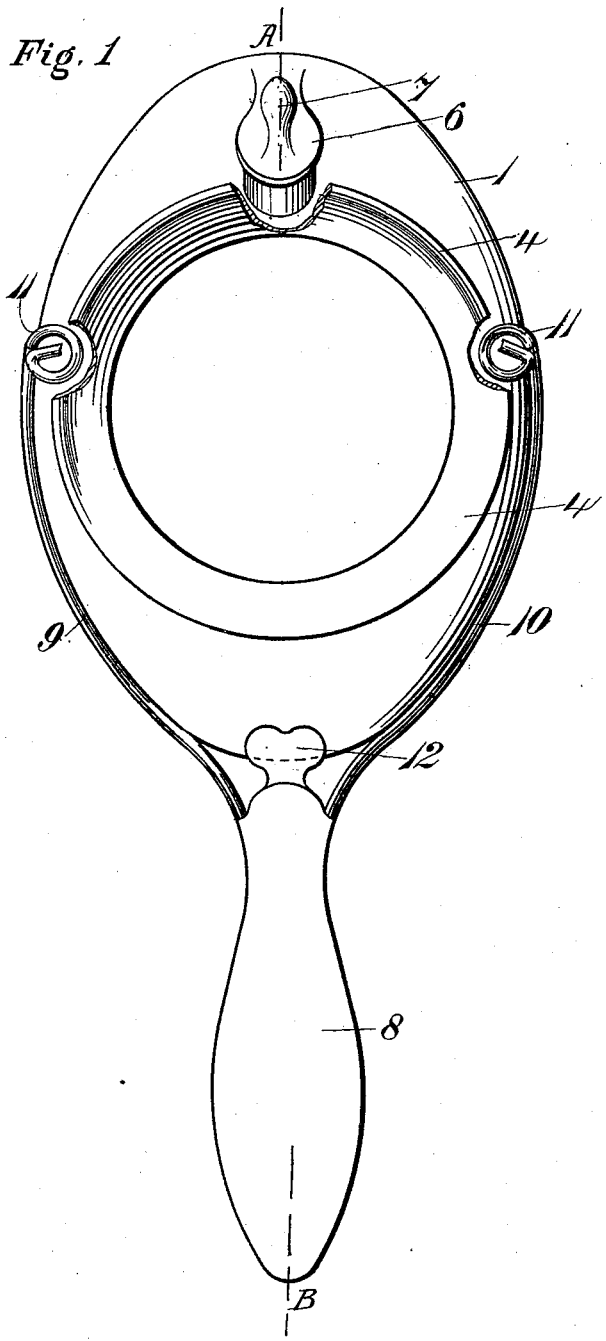
Figure 2:
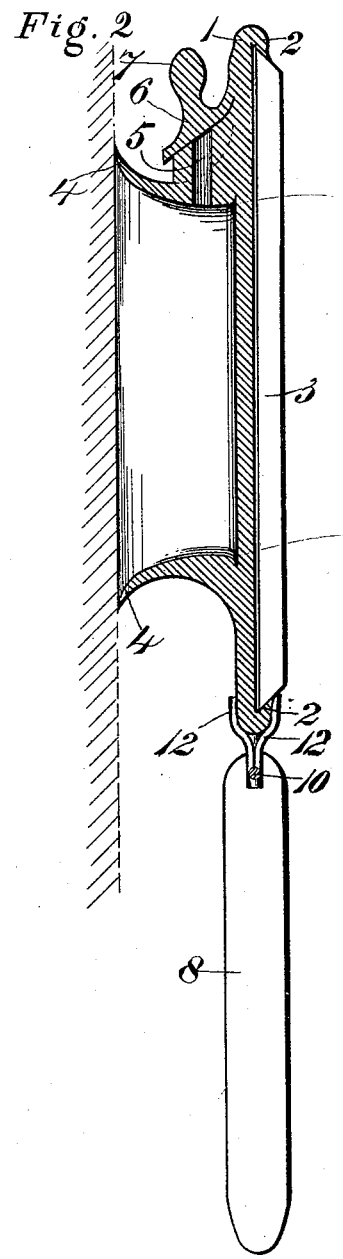

Figure 1 is a rear elevation of the mirror, showing my suction-chamber and the air exhausting and admitting valve applied thereto; and Fig. 2 is a sectional side elevation of the same through the line A B.

Similar numbers of reference designate like parts in both views.

The frame or casing 1 is preferably formed of hard or vulcanized rubber, with its outer edge or flange 2 turned over or flared inwardly to receive and securely hold the mirror-glass 3. On the back or rear surface of the casing 1 is also formed, integral thereon, the annular and outwardly-flaring flange 4, which is preferably formed of a very elastic or flexible rubber for the purpose of permitting said flange to be readily compressed to expel the atmospheric air from the chamber formed within it when said flange is applied to a surface, which produces a vacuum therein and causes the mirror to adhere firmly to the surface with which it is in contact, and also to readily accommodate itself to any comparatively irregular surface and to firmly adhere to it.

In order to facilitate the operation of engaging and disengaging the mirror with and from the surface to which it is applied, I provide the opening or vent 5, connecting the suction-chamber with the atmosphere, and over which aperture is fitted a flexible flap or other suitable valve (preferably of rubber) 6, formed integral or secured firmly on the casing 1 and adapted to open outwardly, thus permitting the free exit of the air from the suction-chamber when applying the flange 4 to a surface. It is obvious that when the pressure is removed from the face of the mirror the flange 4 will, owing to its elasticity, tend to regain its normal form, and thereby produce a partial vacuum, which securely retains the mirror in position on the surface to which it is applied. To destroy this vacuum, the valve 6 is opened or raised by means of its knob 7 to admit the atmospheric air through the vent 5, thus instantly releasing or disengaging the mirror from the surface to which it is applied or attached.

The handle 8 may be of any material or composition suitable for such purpose and is provided with the prongs or rods 9 and 10, which are secured to the handle and extend in opposite directions around the sides of the casing to a point a little beyond its greatest width and where the frame becomes narrower. At this point the rods 9 and 10 are each provided with forked ends 11, which are coiled against the front and back of the casing to neatly clamp the edges of the casing of the mirror.

The clamp 12, which may be formed of any suitable metallic flat material, as shown in the drawings, is secured to the handle 8 between and near the point at which the prongs or bifurcations converge, and is adapted to clamp the bottom edge of the casing of the mirror to firmly secure the latter in position between the bifurcations 9 and 10.

Having thus fully described the construction and operation of my invention, what I claim as novel and useful, and desire to cover by Letters Patent of the United States therefor, is—

1. In a hand-mirror, the combination, with a mirror-casing, of an elastic outwardly-flaring flange formed integral on the back surface thereof, a suitable opening formed in said flange, and suitable means for opening and closing said opening, substantially as and for the purpose set forth.

2. In a hand-mirror, the combination, with a mirror-casing, of an elastic or flexible outwardly-flaring flange formed on the rear surface thereof, a vent-opening, and an automatic closing-flap valve over said opening, substantially as and for the purpose set forth.

3. The combination, with the mirror-casing, of a handle provided with clamping-clips engaging with the end of the casing and the curved rods secured to the handle and extending part way around the sides of the casing and provided with forked ends coiled against the front and the back of the casing, substantially as described and shown.

In testimony whereof I have hereunto set my hand in the presence of two subscribing witnesses.

WILLIAM ALEX. JULIAN.

Witnesses:
JNO. W. DAVY,
W. H. SCHEIFFELE.